United States Patent [19]

Hicks

[11] Patent Number: 4,749,493
[45] Date of Patent: Jun. 7, 1988

[54] METHOD AND APPARATUS FOR OXYGENATING WATER

[76] Inventor: Charles E. Hicks, 40801 SW. 232 Ave., Florida City, Fla. 33034

[21] Appl. No.: 916,713

[22] Filed: Oct. 7, 1986

[51] Int. Cl.$^4$ .............................. C02F 3/04; C02F 7/00
[52] U.S. Cl. ..................................... 210/617; 210/758;
210/150; 210/169; 210/220; 261/91; 261/94;
261/120; 261/DIG. 72
[58] Field of Search ............. 210/150, 151, 219–221.2,
210/169, 170, 615, 617, 758; 261/120, 94, 91,
DIG. 72

[56] References Cited

U.S. PATENT DOCUMENTS

| | | | |
|---|---|---|---|
| 3,235,234 | 2/1966 | Beaudoin | 261/120 |
| 3,966,608 | 6/1976 | Mason et al. | 261/DIG. 72 |
| 3,972,965 | 8/1976 | Higgins | 210/219 |
| 4,439,316 | 3/1984 | Kozima et al. | 261/120 |

FOREIGN PATENT DOCUMENTS

| | | | |
|---|---|---|---|
| 2249703 | 5/1975 | France | 261/91 |
| 448538 | 6/1936 | United Kingdom | 261/91 |

Primary Examiner—Benoit Castel
Attorney, Agent, or Firm—Richard M. Saccocio

[57] ABSTRACT

A method and apparatus for oxygenating water in an aquaculture system without adding nitrogen or other possibly harmful gases. A columnar housing floats in the aquaculture pond on a float ring with a submersible pump immersed in the pond. The pump draws in water and pumps it to the top of an oxygenation chamber which is packed with a surface expansion medium. The oxygenation chamber is filled with oxygen which is transferred to the water falling through the chamber. The oxygenated water is returned to the pond through outlet ports at the bottom of the oxygenation chamber. A cover on the column can be removed at times to allow infiltration of air for aeration of the water.

16 Claims, 1 Drawing Sheet

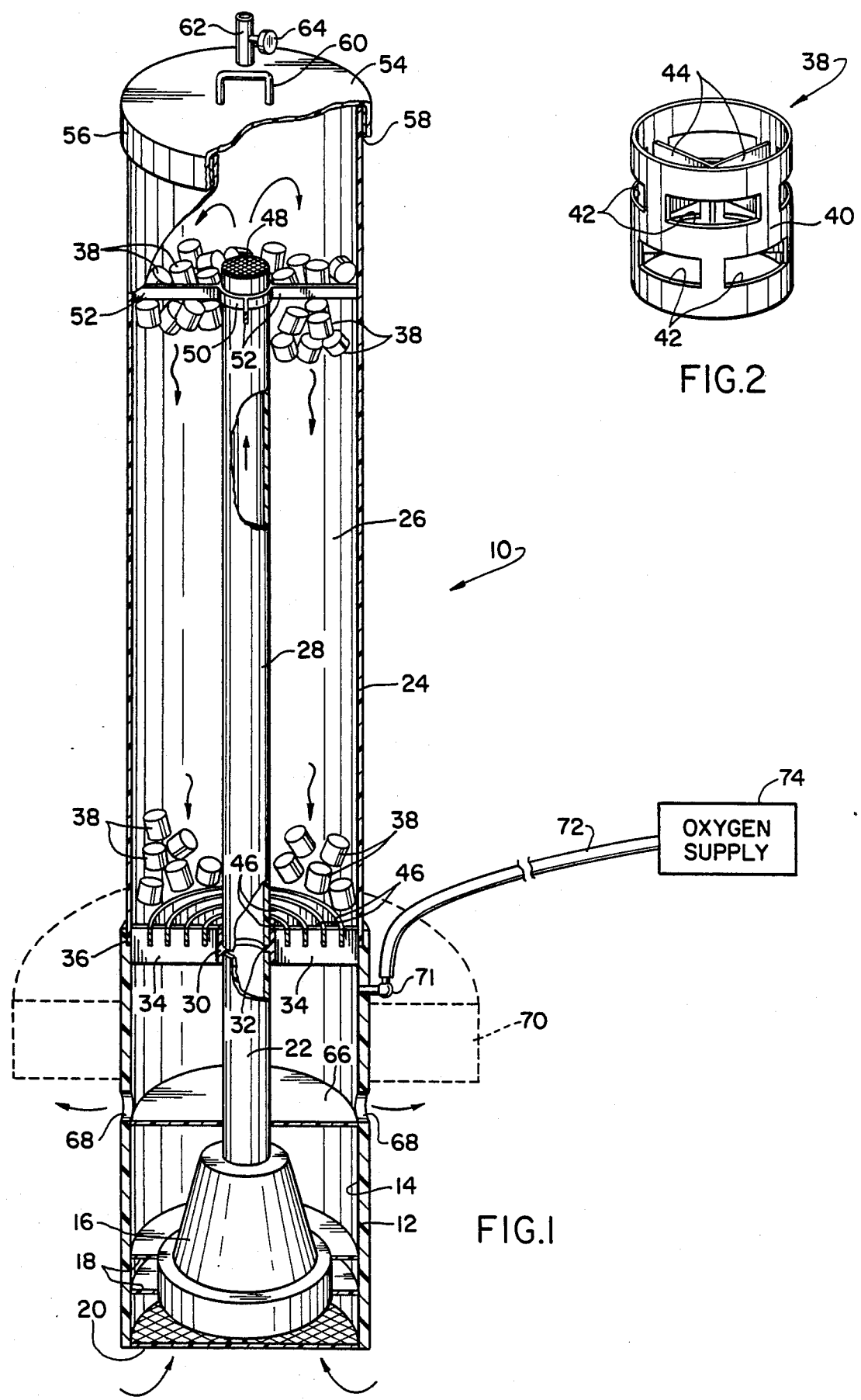

METHOD AND APPARATUS FOR OXYGENATING WATER

BACKGROUND OF THE INVENTION

This invention relates generally to the oxygenation of water and more particularly to a method and apparatus employing packed column techniques to increase the concentration of dissolved oxygen in an aquaculture system.

In recent years, aquaculture production has played an increasingly prominent role in the commercial fish industry, both in the United States and worldwide. The controlled cultivation of fish and other aquatic products is predicted to increase even more dramatically in the near future due in large part to the recognition that the capacity of commercial capture fisheries of traditional species has reached or soon will reach its limit. It is estimated that worldwide aquaculture production will increase five fold by the year 2000 to 21 billion pounds annually. At present, total aquaculture production in the United States is estimated at 500 million pounds and accounts for approximately 11% of the total edible fish and shellfish consumed nationwide. Both private industry and governments have recognized the growing contribution that aquaculture will continue to make to the national and world economy.

The aquaculture systems that are currently in operation make use of a wide variety of facilities having different components, depending upon the species of aquatic organism that is involved. In each aquaculture system, the most economical type and configuration of the rearing facility is determined in part by the species involved and in part by other factors. However, it is necessary in all systems to make water borne oxygen available for the metabolic processes of the aquatic organisms in order to maintain the health of the species and to increase production. Oxygen is normally dissolved by natural interaction between the air and water and by photosynthetic plants and natural infringements on the water such as rain. This maintains an acceptable concentration of oxygen in the water when there is a balance between the aquatic organisms and the natural systems. However, when aquatic plants and animals are present in the water in abnormal concentrations as is the case in high production aquaculture systems, it is necessary to artificially increase the oxygen content of the water.

In the past, the mechanical aerators that have been used for this purpose have taken the form of turbulent bubbling devices, "egg beater" threshers, water wheel churners, or waterjet pump systems. All of these types of aerators are expensive to construct and operate and are inefficient in transferring oxygen to the water, especially when the oxygen level is already high. The closer the oxygen concentration is to saturation, the more difficult and costly it becomes to increase the oxygen level in the water. Perhaps even more importantly, the addition of air to water increases the level of dissolved nitrogen and other gases as well as the oxygen level. When nitrogen is present in water in above normal concentrations, it can cause harmful effects. For example, fish can develop nitrogen bubbles in the bloodstream, and the resulting discomfort can reduce the productive biomass transfer and can lead to other adverse consequences. Because nitrogen is much more soluble in water than oxygen, aeration increases the nitrogen content of water to a greater extent than the oxygen content, and the water can easily become supersaturated with nitrogen. Devices which apply bubbles of oxygen and other gases to water are characterized by inefficiency in the transfer of oxygen to the water and thus common excessive quantities of gas.

SUMMARY OF THE INVENTION

The present invention is directed to a method and apparatus for efficiently oxygenating water without adding possibly detrimental gases such as nitrogen. In accordance with the invention, water is passed through an oxygen rich closed environment so that the oxygen is absorbed into the water without the addition of nitrogen or other gases. A submersible pump draws in water from a pond or other aquaculture system and forces the water through a vertical discharge tube that extends within a columnar chamber that is filled with oxygen and packed with a surface expansion medium. The water falls through the column under the influence of gravity, and the surface area that is exposed to the oxygen is increased by the surface expansion medium. The water is returned to the pond after being saturated with oxygen which dissolves in the water in the oxygen column. In the event that transfer of outside air to the water is desired, it is only necessary to remove a lid from the top of the column to permit air to infiltrate the column and dissolve in the water.

Among the important features of the invention are the ability to scale the size of the oxygenation device up or down through wide limits (depending upon the specific requirements), the ability of the device to be mounted either in the water (floating or stationary) or on the shore at a site that can be enclosed for aesthetic or other reasons, the ability of the device to operate without creating undue turbulence or other disturbance of the ecosystem, the ability to localize the oxygenation (i.e., to select an oxygen deficient area to draw water from and to return oxygenated water to the same or another selected area), and the ability to use the device in a waterfall or other area of naturally falling water.

BRIEF DESCRIPTION OF THE DRAWINGS

In the accompanying drawing which forms a part of the specification and is to be read in conjunction therewith and in which like reference numerals are used to indicate like parts in the various views:

FIG. 1 is a sectional perspective view of an oxygenation device constructed according to a preferred embodiment of the present invention, with portions broken away for purposes of illustration; and FIG. 2 is a perspective view of one of the rings used as the surface expansion medium in the device.

DESCRIPTION OF THE PREFERRED EMBODIMENTS

Referring now to the drawings in more detail and initially to FIG. 1, numeral 10 generally designates an oxygenation device constructed in accordance with the present invention. The device 10 includes a cylindrical housing 12 which presents in its interior a pump chamber 14 at the bottom end of the device. A submersible pump 16 is mounted in the pump chamber 14 and is supported on housing 12 by a pair of mounting plates 18. The intake side of pump 16 faces downwardly, and the lower end of housing 12 is covered by a screen 20 which covers the intake side of the pump. A hollow discharge tube 22 connects with the discharge side of pump 16 and extends upwardly out of the pump chamber 14 along the longitudinal axis of housing 12.

A cylindrical column 24 extends upwardly from the top of housing 12 and essentially forms an upward continuation of the housing. An air tight oxygenation chamber 26 is formed within column 24 and partially within the upper portion of housing 12. A vertical tube 28 is connected end to end with the pump discharge tube 22 and extends within the oxygenation chamber 26 along the longitudinal axis of column 24.

A sleeve 30 is connected with and extends around the lower end of tube 28. An annular rib 32 projects inwardly from sleeve 30 near its midpoint and rests on the top edge of tube 22 with the lower portion of sleeve 30 surrounding the discharge tube. A plurality of radial arms 34 extend outwardly from sleeve 30 and rest at their outer ends on an upwardly facing shoulder 36 formed on housing 12. Column 24 is connected with and extends upwardly from the arms 34. In this manner, column 24 is supported on housing 12 and tube 28 is supported on tube 22 such that column 24 and tube 28 can be removed as a unit due to the connection provided by sleeve 30 and arms 34.

Chamber 26 is packed with a surface expansion medium formed by a plurality of identical rings 38. The construction of each ring 38 is illustrated in FIG. 2. Each ring has a cylindrical wall 40 which is provided with upper and lower rows of arcuate slots 42. The upper slots 42 are staggered relative to the lower slots. Crisscrossing internal baffles 44 are located within each ring 38. The rings 38 are preferably of the type commercially available from Koch Engineering Company, Inc., under the trademark FLEXIRING, although any other suitable type of surface expansion medium can be used.

A plurality of rings 46 are supported on arms 34 and are arranged concentrically with one another between sleeve 30 and column 24. Rings 46 are spaced closely enough together to prevent rings 38 from passing between them.

The top or discharge end of tube 28 is equipped with a screen 48 which prevents rings 38 from entering the tube. Slightly below its top end, tube 28 is fitted with a collar 50. Spokes 52 extend radially from collar 50 and connect at their outer ends with column 24. Arms 34 and spokes 52 maintain tube 28 centered on the longitudinal axis of column 24.

The top end of column 24 is normally closed by a removable cover 54 having a peripheral flange 56 which overlaps the upper edge of column 24. An annular gasket 58 is squeezed between flange 56 and the wall of column 24 in order to provide an air tight seal for chamber 26. A handle 60 on lid 54 facilitates its removal from column 24. Lid 54 has an exhaust port 62 which is opened and closed by a manually operated valve 64.

The pump chamber 14 and the oxygenation chamber 26 are separated by a partition 66 mounted in housing 12 above pump 16. A plurality of discharge ports 68 are formed in housing 12 at a location immediately above partition 66 at the bottom of chamber 26. A conventional flotation collar 70 is fitted on housing 12 at a location above the discharge ports 68 and below an oxygen fitting 71 through which oxygen is delivered to chamber 26. An elongate hose 72 leads to fitting 70 from an oxygen supply 74 which may be a tank of compressed oxygen or other oxygen rich gas.

In use, the oxygenation device 10 is placed in a pond, raceway or other aquaculture system with the bouyant flotation collar 70 on the surface of the pond. This maintains pump 16 immersed in the pond with column 24 and tube 28 oriented vertically in extension well above the surface level of the pond. Pump 16 operates to draw water from the pond through screen 20, and the water is pumped through tubes 22 and 28 and is discharged through the screen 48 located near the top end of column 24. The water then falls under the influence of gravity through the oxygenation chamber 26. Normally, pure oxygen fills chamber 26 and is dissolved in the water as the water falls through the oxygenation chamber and is returned to the pond through the outlet ports 68 which are located below the surface of the pond. Rings 38 intercept the water falling in column 24 and cause it to spread out and break up in order to increase the amount of surface area exposed to the oxygen. This increases the amount of oxygen that is dissolved in the water, as does the increased residence time of the water that results from the presence of rings 38. Rings 38 also cause the water of flow in thin sheets which enhances the boundary effects to further increase the transfer of oxygen to the water.

In this manner, the water becomes super saturated with oxygen which is thereby made available to the organisms in the aquaculture system. At the same time, the device prevents the water from reaching super saturated levels of concentration of other possibly harmful gas such as nitrogen, since the oxygenation chamber 26 contains pure oxygen or another oxygen rich gas that is devoid of harmful gases. When the oxygen supply 74 is activated to begin applying oxygen to the chamber 26, the exhaust valve 64 is preferably opened so that air and other gases within chamber 26 can be vented to the atmosphere. When chamber 26 has been completely filled with oxygen or other oxygen rich gas, valve 64 should be closed to maintain a closed oxygen rich system for the water to pass through. It is noted that a positive pressure is maintained in chamber 26 by the combined effects of the oxygen pressure from the source 74 and the pressure produced by pump 16.

It may at times be desirable to transfer outside air to the water instead of oxygen. In this event, the cover 54 can simply be removed, and chamber 26 is then exposed to the atmosphere such that outside air infiltrates chamber 26 and is transferred therein to the water which falls through chamber 26 and the expansion rings 38. The construction and arrangement of the device makes it more efficient on aerating water than conventional aerators.

Column 24 and tube 28 can be removed as a unit from housing 12 and tube 22 simply by lifting column 24 upwardly. This lifts sleeve 30 off of tube 22 and lifts arms 34 off of housing 12. Rings 38 can then be removed from column 24 for cleaning by removing cover 54 and discharging the rings through the top end of the column. The ability of the unit to be detached in this manner facilitates servicing of other components also.

Preferably, the various parts of device 10 are constructed of ABS plastic, heavy duty polyvinyl chloride or another material which is not chemically reactive with water and also non-toxic to aquatic organisms. The material should also be lightweight because the device is portable and should be maintained at a low enough weight to be easily carried and maneuvered. Column 24 can be approximately 36 inches high and 10 inches in diameter so that the device can be easily carried. Tubes 22 and 28 may be approximately 2 inches in diameter.

It should be noted that the pump intake can be connected with one or more hoses or pipes which extend to various parts of the pond or other body of water. This, with suitable valving of the hoses or pipes, allows a particular area of the pond to be selected for the input water, and it is contemplated that an oxygen deficient area or areas will normally be selected. It is also particularly important to note that the pump 16 need not be submerged in the pond and that the device 10 can be supported in or out of the water on a boom or stand. The device can be mounted on the shore in a suitable enclosure and with suitable hose connections to the pond in order to avoid detracting from the aesthetic appeal of the surrounding environment. The outlet ports 68 can be connected with hoses or pipes that lead to selected areas of the body of water, thus permitting the oxygen rich water to be directed back into the pond wherever desired, including the area from which the oxygen deficient water was drawn or any other area, without creating undue turbulence or other major disturbances of the ecosystem.

It is also contemplated that the oxygen entry rate can be monitored and controlled so that the quantity of oxygen entering chamber 26 matches the quantity transferred to the water. A water level sensing device can be provided to control the positive pressure in chamber 26 such that it is maintained high enough to keep the water level inside of the device lower than the level in the pond. This pressure level enhances the oxygen transfer to the water and thus increases the efficiency of the device in performing its intended function.

The device 10 is constructed such that its size can be varied as desired within wide limits, such as from a very large size down to a size suitable for an ordinary fish tank. It is also to be noted that the device can use as input water the water flowing in a waterfall or other natural flow pattern, thus dispensing with the need for the pump altogether or making use of the pump to provide only a part of the water that is to be oxygenated.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. Apparatus for oxygenating water contained in a body of water, said apparatus comprising:
   a housing presenting a columnar oxygenation chamber having an elevated inlet for receiving water from said body;
   means for supporting the housing with the inlet disposed in communication with the body of water to receive water therefrom;
   means for supplying oxygen rich gas to said oxygenation chamber for transfer of oxygen to the water which falls through the oxygenation chamber from the inlet thereof;
   a surface expansion medium in said oxygenation chamber for increasing the surface area of the water exposed to the oxygen rich gas therein and thereby aiding in the oxygenation of the water flowing therethrough;
   a water outlet in a lower end portion of said oxygenation chamber for returning the oxygenated water to the body of water;
   a pump chamber in said housing separated from the oxygenation chamber;
   a pump in said pump chamber having an intake side communicating with said body of water and a discharge side;
   a substantially vertical conduit communicating with the discharge side of said pump, said conduit having an outlet end in said oxygenation chamber to provide said inlet to the oxygenation chamber;
   a screen on said outlet end of said conduit for preventing said surface expansion material from entering the conduit; and,
   a lower support at the bottom of said oxygenating chamber having openings therethrough allowing the passage of water but preventing the passage of said surface expansion medium therethrough.

2. Apparatus as set forth in claim 1, wherein said housing and conduit each comprise two sections separable from one another.

3. Apparatus as set forth in claim 1, including:
   an upper section of said housing presenting said oxygenation chamber therein;
   a lower section of said housing presenting said pump chamber therein;
   an upper section of said conduit extending within said upper section of the housing;
   a lower section of said conduit extending within said lower section of the housing; and
   means for coupling said upper and lower sections of said housing together and said upper and lower sections of said conduit together, said coupling means being releasably to permit the upper sections of the housing and conduit to be removed from the lower sections thereof.

4. Apparatus as set forth in claim 3, including upper and lower supports extending between the interconnecting the upper section of the housing and the upper section of the conduit to permit detachment of said upper sections as a unit from the lower sections.

5. Apparatus as set forth in claim 3, including a removable cover on said upper section of the housing.

6. Apparatus as set forth in claim 1, wherein said oxygenation chamber is substantially airtight.

7. Apparatus as set forth in claim 6, including an exhaust port for venting said oxygenation chamber to the atmosphere and valve means for opening and closing said exhaust port.

8. Apparatus as set forth in claim 6, including a removable lid disposed on said oxygenation chamber and sealed thereto, said lid being removable to admit outside air into the oxygenation chamber for transfer therein to the water.

9. Apparatus as set forth in claim 1, wherein said means for supporting the housing with the inlet disposed in communication with the body of water to receive water therefrom comprises a buoyant float ring connected with said housing.

10. Oxygenation apparatus for increasing the dissolved oxygen in a body of water containing cultivated aquatic organisms, said apparatus comprising:
    a columnar housing having upper and lower portions respectively presenting an air tight oxygenation chamber and a pump chamber, said housing being portable and being adapted for positioning in the body of water with said oxygenation chamber extending generally vertically above the water level;

pump means in said pump chamber having an intake side for receiving water from the body of water and a discharge side;

a discharge conduit for the pump having a lower end communicating with said discharge side of the pump to receive water therefrom, said conduit extending within the oxygenating chamber and having an outlet opening thereinto to deliver the water to the oxygenation chamber at an elevated position;

means for supplying oxygen to said oxygenation chamber for transfer to the water which falls from said outlet of the conduit through said oxygenation chamber;

a surface expansion medium in said oxygenation chamber for increasing the surface area of the water exposed to the oxygen therein and thereby aiding in the oxygenation of the water flowing therethrough;

a water outlet in said oxygenation chamber for directing the oxygenation water back into the body of water;

a screen on the outlet of said discharge conduit for preventing the surface expansion medium from entering the conduit; and a lower support at the bottom of said oxygenating chamber having openings therethrough allowing the passage of water but preventing the passage of said surface expansion medium therethrough.

11. Apparatus as set forth in claim 10, including a removable lid on said housing for closing the top of the oxygenation chamber in air tight fashion, said lid being removable to admit outside air to the oxygenation chamber for transfer therein to the water.

12. Apparatus as set forth in claim 11, including an exhaust port for said oxygenation chamber for exhausting air therefrom when said oxygen supplying means becomes activated, and valve means for opening and closing said exhaust port.

13. Apparatus as set forth in claim 10, including spaced apart upper and lower support members extending between and interconnecting the housing and discharge conduit.

14. Apparatus as set forth in claim 10, including:

upper and lower portions of said conduit;

means for coupling said upper and lower portions of the housing with one another and said upper and lower portions of said discharge conduit with one another, said coupling means permitting detachment of said upper portions from said lower portions; and means for connecting said upper portion of the housing with said upper portion of the conduit to permit removal of said upper portions together as a unit.

15. A method of increasing the amount of oxygen dissolved in a body of water containing cultivated aquatic organisms, said method comprising the steps of:

providing a closed column filled with an oxygen rich gas, said column having upper and lower portions presenting an air tight oxygenating chamber and a pump chamber said housing being adapted for positioning in a body of water with said oxygenating chamber extending generally vertically above the water level;

providing in said column a surface expansion medium for increasing the surface area of the water exposed to the oxygen therein;

directing water from the body of water to the top of the column by pump means having an intake side for receiving water from the body of water with a discharge side having a conduit extending therefrom and into and through the oxygenating chamber to the top of the column with a screen at the outlet end of said conduit to permit the water to fall through the column and dissolve the oxygen therein; said oxygenating chamber having a lower support at the bottom thereof, said lower support at the bottom thereof, said lower support having openings therethrough allowing the passage of water but preventing the passage of said surface expansion medium therethrough and, returning the oxygenated water to the body of the water by a water outlet in said oxygenating chamber.

16. The method of claim 15, including the step of applying outside air to said column for transfer to the water falling therein.

* * * * *